UNITED STATES PATENT OFFICE.

CARL BOCKING, OF NEW YORK, N. Y.

PRODUCTION OF FIBROUS MATERIAL FOR SPINNING AND WEAVING AND FOR OTHER PURPOSES.

SPECIFICATION forming part of Letters Patent No. 240,952, dated May 3, 1881.

Application filed August 30, 1880. (No specimens.)

*To all whom it may concern:*

Be it known that I, CARL BOCKING, a citizen of the United States, residing at New York, in the county of New York and State of New York, have invented a new and useful Improvement in Production of Fibrous Materials for Spinning and Weaving and for other Purposes; and I hereby declare the following to be a full, clear, and exact description of the same, sufficient to enable any one skilled in the art to which my invention appertains to carry it into effect.

In carrying out my invention I take the leaves of the *Agave Americana* or American aloe, a plant which is very abundant in the southern parts of North America, as well as in parts of South America. The leaves being cut up into lengths of one foot, more or less, as convenience or preference may dictate, are soaked and dried, and then crushed by machinery. They are then boiled in a solution of borax of the strength of from 1° to 2° Baumé, and for a period of four hours, more or less. The material is then treated with the vapor of bisulphide of carbon, the said vapor being passed through the material in a suitable apparatus. It is then thoroughly washed with a chlorine and alkaline or soapy solution, and when dried will be found to have acquired a bright white and lustrous surface similar to silk.

The wash is made by taking water saturated with chlorine gas, mixing therewith an equal part of a caustic-soda solution of about 33° Baumé. I put from two to four gallons of this mixture in one hundred gallons of a solution of chloride of lime of the strength of about $2\frac{1}{2}$° Baumé.

The fiber may be boiled in the solution or soaked therein from two to three hours.

The fiber is long, flat in shape, and uniform, and of great strength, durability, and delicacy, and is better adapted than cotton for taking and holding color. It is admirably adapted for spinning and weaving, either alone or used with wool, silk, and other fibers, and also for coating with silk solution, the mode of making and applying which it is my intention to make the subject of a separate application for Letters Patent.

Having thus described my invention, the following is what I claim as new and desire to secure by Letters Patent:

The process of producing fibrous material for spinning and weaving from the leaves of the *Agave Americana* by maceration, disintegration, by crushing, hackling, or other usual mechanical means, boiling in borax solution, treating with bisulphide of carbon vapor, and washing in a chlorine and alkaline or soapy solution, substantially as set forth.

CARL BOCKING.

Witnesses:
OCTAVIUS KNIGHT,
HERVEY S. KNIGHT.